(12) United States Patent
Harel

(10) Patent No.: US 7,860,673 B2
(45) Date of Patent: Dec. 28, 2010

(54) DISTANCE MEASURING DEVICE

(76) Inventor: Yair Harel, 1602 Goldfinch Way, Sunnyvale, CA (US) 94087

( * ) Notice: Subject to any disclaimer, the term of this patent is extended or adjusted under 35 U.S.C. 154(b) by 1303 days.

(21) Appl. No.: 11/373,889

(22) Filed: Mar. 13, 2006

(65) Prior Publication Data

US 2006/0202911 A1    Sep. 14, 2006

Related U.S. Application Data

(60) Provisional application No. 60/661,463, filed on Mar. 14, 2005.

(51) Int. Cl.
*G09G 5/00* (2006.01)
(52) U.S. Cl. ........................................................ 702/68

(58) Field of Classification Search .................... 702/68
See application file for complete search history.

(56) References Cited

U.S. PATENT DOCUMENTS 4,158,229 A * 6/1979 Woo et al. .................... 702/161
6,636,296 B1 * 10/2003 Faulkner et al. ............... 356/21

* cited by examiner

*Primary Examiner*—Tung S Lau

(57) ABSTRACT

Parallax is the apparent "shift" or "movement" of an object caused by a change in the position of the observer and is the phenomenon upon which the claimed invention operates. The invention is a mechanical device, comprising a viewing slide which has been marked with a series of markings, which is used to estimate the distance between an observer using the invention and an observed object within the field of view of the observer. When using the invention, the observer shall designate an observed object and take a series of steps using the invention. As a result of the parallax effect, the invention will then provide the observer with an estimate of the distance between the observer and the designated object.

10 Claims, 5 Drawing Sheets

Viewing Slide with Markings on a Linear Scale

Figure 1: Viewing Slide with Markings on a Linear Scale
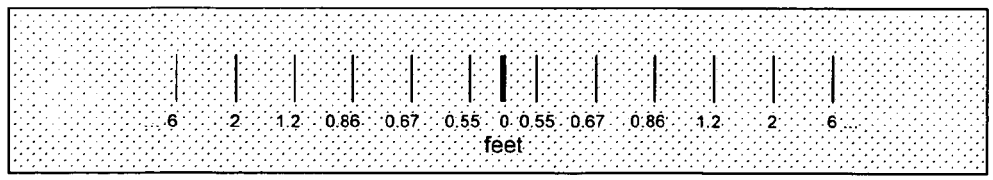

Figure 2: Viewing Slide with Markings on a Logarithmic Scale
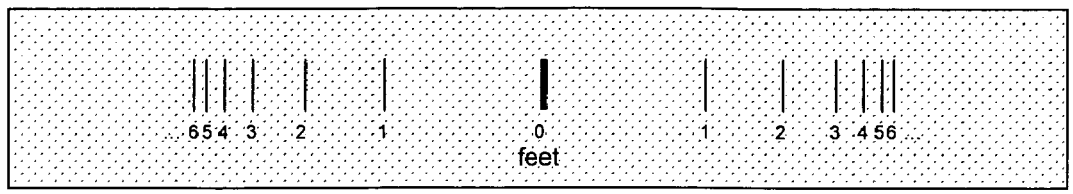

Figure 3: Step Two in the Operation of the Invention
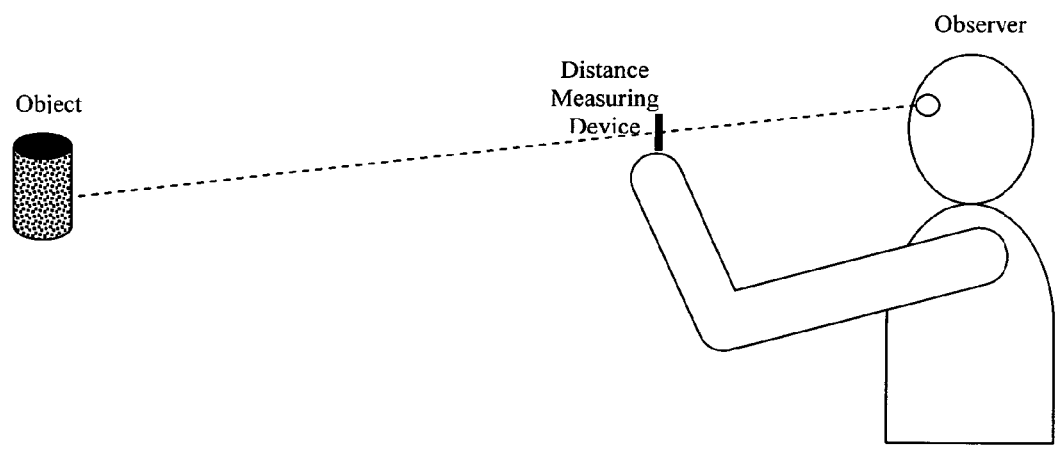

Figure 4: Diagram of Variables and Elements

Legend

*This Figure assumes the Observer closes the Left Eye in Step Three*

L: The distance between the Observer's eyes and the Distance Measuring Device

S: The distance between the Observer and the Observed Object

X: The distance between the Center Mark and the Measurement Mark

D: The distance between the eyes of the user

Center Mark: The mark located at the center of the Distance Measurement Device, with a corresponding numerical mark of zero.

Measurement Mark: The mark coinciding with the Observed Object in Steps Five, Six and Seven.

Line of Sight 1: A direct line between the eye the user keeps open in Steps Three and Four and the Observed Object.

Line of Sight 2: A direct line between the eye the user opens in Step Five and the Observed Object.

α, β, and δ: Angles

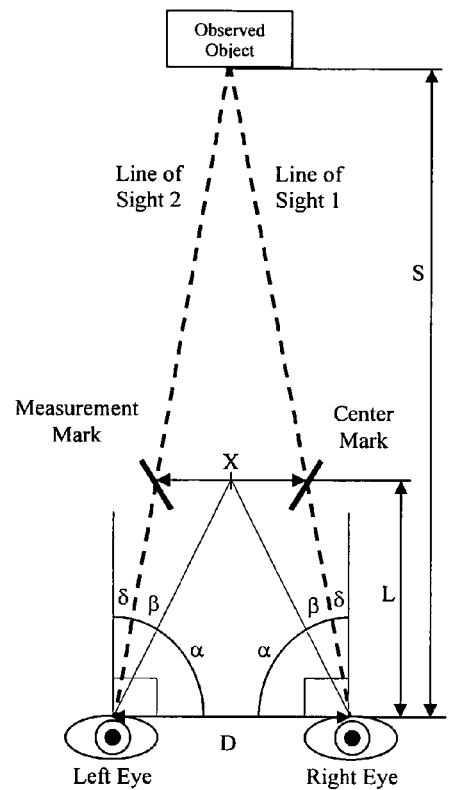

Figure 5: Formula Derivation $$\alpha + \beta + \delta = 90°$$

$$\alpha = \arctan\left(\frac{L}{D/2}\right) = \arctan\left(\frac{2L}{D}\right) \quad hence \quad L = \frac{\tan(\alpha)}{2D}$$

$$\delta = \arctan\left(\frac{D/2 - X/2}{L}\right) = \arctan\left(\frac{D-X}{2L}\right)$$

$$\beta = 90 - \alpha - \delta = 90 - \arctan\left(\frac{D-X}{2L}\right) - \alpha$$

$$\tan(\alpha + \beta) = \frac{S}{D/2} = \frac{2S}{D} \quad hence \quad S = \frac{D * \tan(\alpha + \beta)}{2}$$

$$susbstituting\ \beta: \quad S = \frac{D * \tan\left(\alpha + 90 - \arctan\left(\frac{D-X}{2L}\right) - \alpha\right)}{2}$$

$$collecting: \quad S = \frac{D * \tan\left(90 - \arctan\left(\frac{D-X}{2L}\right)\right)}{2}$$

$$solving\ for\ X: \quad X = D - \tan\left(90 - \arctan\left(\frac{2S}{D}\right)\right) * 2L$$

DISTANCE MEASURING DEVICE

CROSS REFERENCE TO RELATED APPLICATIONS

This nonprovisional patent application claims the benefit of the filing date of provisional application No. 60/661,463, filed Mar. 14, 2005, which is herein incorporated by reference.

STATEMENT REGARDING FEDERALLY SPONSORED RESEARCH AND DEVELOPMENT

No Federally sponsored research or development was requested for, accepted, or used in the development related to the invention herein claimed.

BACKGROUND OF THE INVENTION

The invention, and method of its use, estimates the distance between an observer and an observed object through parallax. Parallax is the apparent "shift" or "movement" of an object caused by a change in the position of the observer. The use of parallax to measure distances is well established, such as the use of parallax to measure the distance between the Earth and heavenly bodies, including distant stars.

Parallax is also the basis for depth perception in human sight. Each eye "sees" a slightly different image; the fusion of these two stereo images provides the observer the ability to discern the depth of observed objects in the fused image. This aspect of the parallax effect has been used in devices to create a "three-dimensional" effect through the simultaneous viewing of a pair of stereo images. Common examples of devices that embody this use of parallax include nineteenth century stereoscopes and the ViewMaster™ toy produced by Mattel, Inc.

BRIEF SUMMARY OF THE INVENTION

The present invention is a mechanical device used to estimate the distance between an observer using the device and an observed object within the field of view of the observer. The invention consists of a simple mechanical device through which the observer shall designate an observed object. After taking a series of discrete steps in a procedure, the invention shall provide the observer with an estimate of the distance between the observer and the designated object.

BRIEF DESCRIPTION OF THE FIGURES

FIG. 1 presents a diagram of the viewing slide component of the invention which uses a linear scale.

FIG. 2 presents a diagram of the viewing slide component of the invention which uses a logarithmic scale.

FIG. 3 illustrates a step in the process of using the invention to estimate a distance.

FIG. 4 presents a diagram of the variables and elements used by a person constructing the invention and an observer using the invention.

FIG. 5 presents the derivation of Equation 1 listed in the specification.

DETAILED DESCRIPTION OF THE INVENTION

In the first embodiment of the invention, which is the preferred embodiment of the invention, the device consists of a transparent or translucent piece of plastic or glass embossed with markings (referred to as a "viewing slide"). These markings include reference points used to designate the observed object. Each reference point marking includes a corresponding numerical marking which shall indicate the distance, in units listed on the viewing slide, between the observer and the observed object. In this embodiment, the translucent or transparent viewing slide may contain an extended portion which the observer shall use to directly hold the slide while using it. In the alternative, the device may also include a housing surrounding the viewing slide and may also include a "grip" for the user to hold the device while using it. In this embodiment of the invention, the observer may look "through" the transparent or translucent material of the viewing slide to designate the observed object.

In the second embodiment of the invention, the viewing slide may take the form of a piece of opaque material. The material used for construction of the viewing slide may include, but not be limited to, plastic, metal, or wood. The viewing slide is embossed with markings on its edge; as in the first embodiment of the invention described above, these markings include both the reference point markings and numerical markings corresponding to each reference point marking. In this embodiment, the opaque viewing slide may contain an extended portion which the observer can use to directly hold the slide while using it. In the alternative, the device may also include a housing surrounding the viewing slide and may also include a "grip" for the user to hold the device while using it. In this embodiment of the invention, the observer will hold the device so that the reference markings of the viewing slide are positioned above, below or next to the designated observed object.

In the third embodiment of the invention, the device consists of a housing into which various viewing slides may be inserted and removed. The viewing slides may take the form of materials which are transparent, translucent, or opaque. The viewing slides are embossed with markings as described above; these markings include both the reference point markings and numerical markings corresponding to each reference point marking. In this embodiment of the invention, the distance between the reference points and numerical markings shall vary according to the specific eye-to-eye distance of the observer. Each slide shall include a marking indicating the range of eye-to-eye distances for which it is applicable. The user(s) of the invention may insert and remove the various viewing slides in order to match their personal eye-to-eye distances in order to obtain the most accurate measurement of the distance between the user and the observed object.

In the fourth embodiment of the invention, the device takes the form as described above as the "second form," except that the opaque viewing slide is an element of another object or tool. Such elements may include, but are not limited to, a handle of a magnifying glass, a case of a compass, a side of a ruler or other measuring device, a mobile phone or other mobile communications device, or a part of a self-contained "combination tool," such as a "Swiss Army Knife."

In the fifth embodiment of the invention, the device takes the form as described above as the "first embodiment," except that the translucent material of the viewing slide will be a liquid crystal display (LCD) screen or other transparent or translucent material capable of displaying electronically generated markings. In this form, the markings will be dynamic and generated and displayed by an electronic computer, which is made a part of the device. In addition to displaying the markings, the electronic computer may be capable of recalibrating the markings in order to (1) display the markings in distances of meters, feet or other units; (2) allow the observer to enter a specific eye-to-eye distance into the electronic computer via a keypad or other input mechanism; and (3) allow the observer to enter into the electronic computer (again via a keypad or other input mechanism) a specific distance between the device and the observer's eyes.

In all embodiments of the invention, the viewing slide can retain the option of using only numerical markings. Should the invention use this option, the numerical point markings would act in the same capacity as the reference point markings.

In all embodiments of the invention, an optional ruler may be included as a part of the device. The ruler may take the form as a "fold-out" ruler or as a ruler made of a flexible material (e.g., a "tape ruler") which may be extended from the device. The observer may use this optional ruler to accurately measure the distance between the observer and the observed object after obtaining a distance measurement using the device. The observer may wish to take this step to check or verify the accuracy of the device after using it. Additionally, the ruler may be used to measure the distance between the invention and the observer's eyes (the distance "L" described below), or to measure the observer's "eye-to-eye" distance (the distance "D" described below).

In all embodiments of the invention, the reference point markings and corresponding numerical markings may take the form of either a "linear scale" (see FIG. 1), in which the markings are equally spaced, a "logarithmic scale" (see FIG. 2), or a combination of both scales. Other scales may also be used by those conversant in the art or those manufacturing the invention, such as a scale of marks indicating distances of 5 ft., 10 ft., 15 ft., etc.

A person skilled in the art of mechanical devices can make the invention by a number of steps. First, the skilled person would take a statistical sampling of the "eye-to-eye" distance of a number of potential observers. The eye-to-eye distance is the distance between the pupils of the eyes of a human being. After this sample is taken, the skilled person would calculate a length, "D," which would reflect the eye-to-eye distance of a typical observer. The length "D" may be calculated as an arithmetic mean, median, or mode of the statistical sample. The skilled person would then choose a fixed distance, "L," at which the observer would hold the device from his/her eyes when using the invention. Next, the skilled person would choose a set of distances (hereinafter the "Distance Set") comprising a number of discrete distances. The distances in the Distance Set would be represented by the variable "S" which indicates the distance between the observer using the invention and the observed object designated by the observer. The skilled person would then mark the center of the viewing slide with a center reference point mark (hereinafter the "Center Mark") labeled with the numerical marking "0", indicating a distance of zero units.

The skilled person would then choose a distance "S" from the set of discrete distances, and solve Equation 1 for the distance "X" using the previously defined variables S, D, and L:

$$X = D - \tan(90 - \arctan(2S/D)) * 2L \quad \text{Equation 1}$$

The derivation of Equation 1 may be found in FIG. 5. FIG. 5 references FIG. 4 described below.

The skilled person would then emboss the viewing slider with a two reference point marks located on each side of the Center Mark. The distance between each new mark and the Center Mark would be equal to the length "X" as calculated above. These new reference point marks are then marked with numerical marks equal to the distance "S." The skilled person would continue this process, calculating a value "X" for every value "S" in the Distance Set, and mark the viewing slide accordingly. With the viewing slide (or slides) so marked, the skilled person could then install the viewing slide in a housing unit, and attach a holding grip to the housing unit.

If the skilled person chooses the third embodiment of the invention, the skilled person would mark a new viewing slide for each eye-to-eye distance "D" in a set of eye-to-eye distances as chosen by the skilled person. The skilled person would then build a housing unit into which each viewing slide may be inserted and removed.

In order to use the invention to estimate the distance between the observer using the invention and a designated object, the observer will take the following series of steps.

In Step One, the observer designates an observed object within his/her field of view. It is suggested that the device can most effectively gauge the distance between the observer and an observed object when said distance is up to approximately twenty (20) feet. As such, observers using the device may be notified in instructions accompanying the device, or through a notice imprinted on the device itself, that observed objects very far away should not be designated.

In Step Two, the observer places the invention a pre-determined distance "L" away from his/her eyes. The length "L" may be provided to the observer by a set of instructions accompanying the invention, or the length "L" may be described by instructions embossed on the invention itself. The observer then views the observed object either through or next to the viewing slide of the invention. At this point in the process, the physical layout of the observer, the invention, and the observed object should appear as in FIG. 3. The observer will hold the invention in this manner for the remainder of the steps of the procedure.

In Step Three, the observer closes one of his/her eyes. Either eye may be shut as the viewing slide has its reference point and numerical marks on either side of the Center Mark.

In Step Four, the observer aligns the orientation of the invention so that the Center Mark of the viewing slide lies directly over, above, below, or next to the observed object. The exact alignment of the Center Mark with respect to the observed object will vary depending upon which form of the invention the observer is using. The Center Mark will then coincide with the line of sight between the observed object and the observer's open eye. If the observed object is large, the observer may choose to designate a specific point on the observed object and align the Center Mark on said specific point. This option may allow the user to align the Center Mark with greater ease and also to obtain a more accurate estimate of the distance to the observed object.

In Step Five, after aligning the invention in the manner of Step Four, the observer will close his/her open eye and thereafter open the eye that the observer had closed in Step Three.

In Step Six, the observer will use the eye that he/she opened in Step Five to designate the observed object either through or next to the viewing slide of the invention. If the observer has chosen the option of designating a specific point on a large observed object, as enumerated in Step Four, then the observer shall designate said specific point either through or next to the viewing slide of the invention. The observer will use the eye that he/she opened in Step Five to read the numerical marking corresponding to the reference marking directly over, above, below, or next to the observed object (the "Measurement Mark"). The Measurement Mark will coincide with the new line of sight between the observed object and the eye that the observer opened in Step Five. The value of the numerical mark corresponding to the Measurement Mark is the distance, as calculated by the invention, between the observer and the observed object.

In Step Seven, if the observed object falls between two reference markings, the observer can estimate the distance to the observed object by interpolating the position of the observed object between the numerical markings corresponding to the two reference markings between which the observed object is positioned.

FIG. 4 indicates the various lines of sight and variables used in the steps enumerated. FIG. 5, the derivation of Equation 1, makes reference to the various lines of sight and variables of FIG. 4.

The skilled person may optionally choose to forgo building the invention with a Center Mark, and instead replace the Center Mark with a "Main Mark." The Main Mark is located on either side of the viewing slide near the slide's edge and the reference and numerical marks will be located on only one side of the Main Mark. When using this form of the invention, the observer will always use only one eye (that eye being the eye on the same side of the viewing slide as the Main Mark) to align the Main Mark with the designated object in Step Four. In the Claims, the term "main mark" is used to reference the Center Mark or the Main Mark.

I claim:

1. A device used by an observer to estimate the distance between said observer and a designated object, comprising:
    a planar surface marked with reference point markings, said reference point markings including a single main mark located on said planar surface, and a plurality of reference point markings,
    said plurality of reference point markings including corresponding numerical marks associated with said reference point markings, wherein a distance between each of said plurality of reference point markings and said single main mark has been determined prior to the construction of the device,
    said reference point markings and said single main mark providing corresponding dimensions with respect to said observer's eye-to-eye so as to allow estimation of said distance between said observer and said designated object using a parallax effect when said device is held between said observer's eyes and said designated object, and
    a solid housing or grip which said observer may use to hold the device during its operation.

2. The device of claim 1, in which each of said reference point markings are separated according to distances selected from the group consisting of: distances determined using a linear scale in which each said distance between each of said reference point markings is of an equal distance, distances determined using a logarithmic scale, and distances determined using both a linear scale and a logarithmic scale.

3. The device of claim 1, in which said planar surface lacks said reference point markings but includes said numerical marks, wherein said numerical marks act as said reference point markings.

4. The device of claim 1, wherein said planar surface made of an opaque material, a translucent material, or a transparent material.

5. The device of claim 4, wherein said solid housing or grip comprises the same piece of material from which said planar surface is made of, comprising an opaque material.

6. The device of claim 4, where no said solid housing or grip is attached to said planar surface made of an opaque material, and said planar surface made of an opaque material is included as an element of a different device.

7. The device of claim 6, wherein said different device is selected from the group consisting of: a magnifying glass, a compass, a ruler, a measuring device, a mobile phone or other mobile communications device, a self-contained "combination tool," and a "Swiss Army Knife."

8. The device of claim 1, in which said planar surface may be removed from said housing or grip and replaced by one of a plurality of additional planar surfaces, wherein said reference marks on said additional planar surfaces vary according to a plurality of "eye-to-eye" distances, said additional planar surfaces including a marking indicative of the said "eye-to-eye" distance for which said additional planar surface has been calibrated.

9. The device of claim 1, wherein said planar surface comprising a liquid crystal display screen or other electronic display screen, wherein said reference point markings are displayed as electronically generated markings on said display screen; and
    further comprising an electronic computer, said electronic computer capable of displaying said electronically generated markings on said display screen; and
    further comprising input means so that said observer may enter data into said electronic computer, said data including information regarding said observer's "eye-to-eye" distance and the distance between said observer and the device of claim 1.

10. The device of claim 1, further comprising a physical measuring device, said physical measuring device selected from the group consisting of: a ruler, a "fold-out" ruler, a tape measure, a ruler made of flexible material, and an electronic measuring device.

\* \* \* \* \*